May 7, 1929.   D. F. MALTBY   1,712,444
POWER MULTIPLYING MECHANISM
Filed Jan. 21, 1928   2 Sheets-Sheet 1
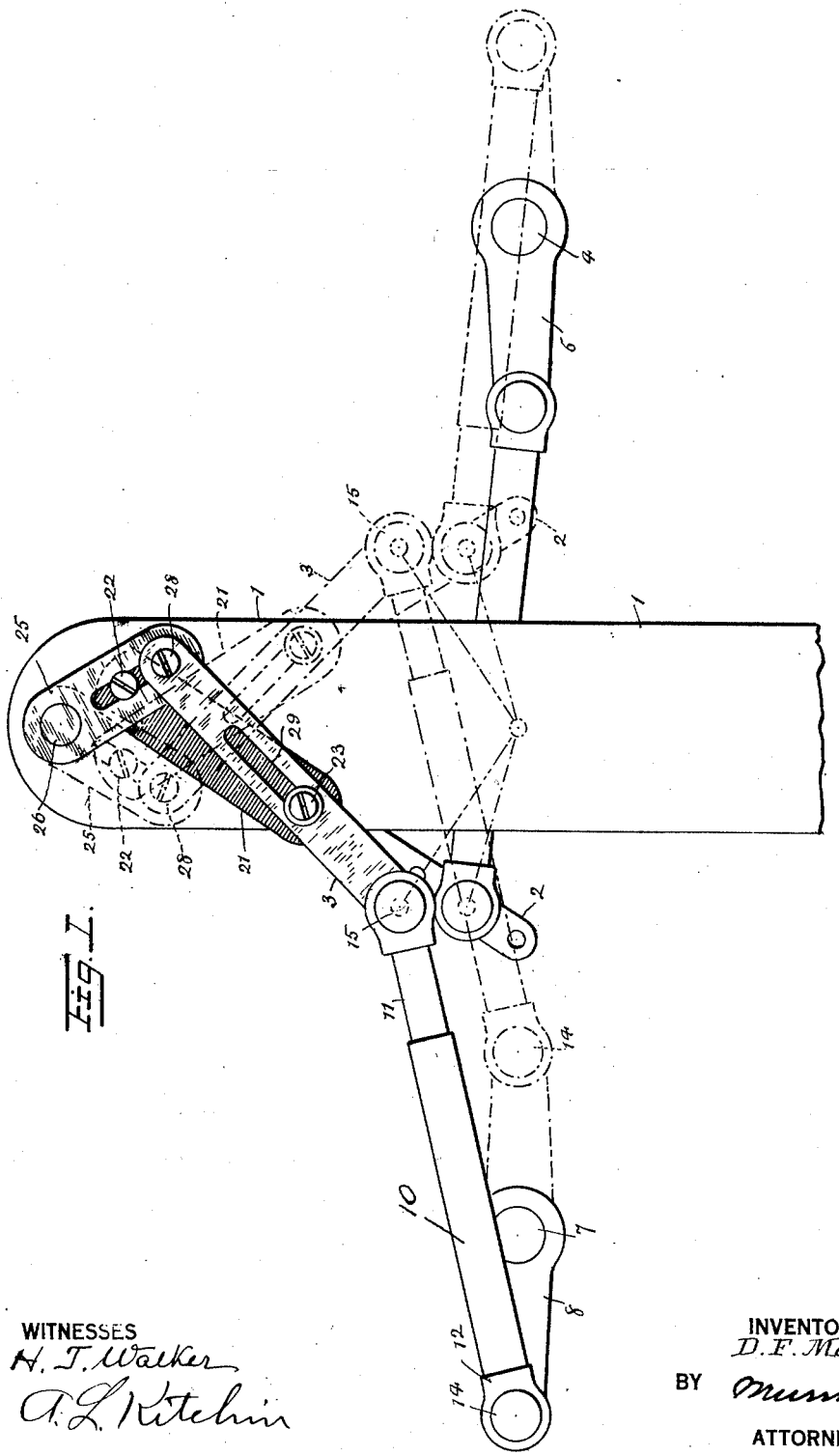
WITNESSES
H. T. Walker
A. L. Kitchin
INVENTOR
D. F. Maltby
BY Munn & Co.
ATTORNEY

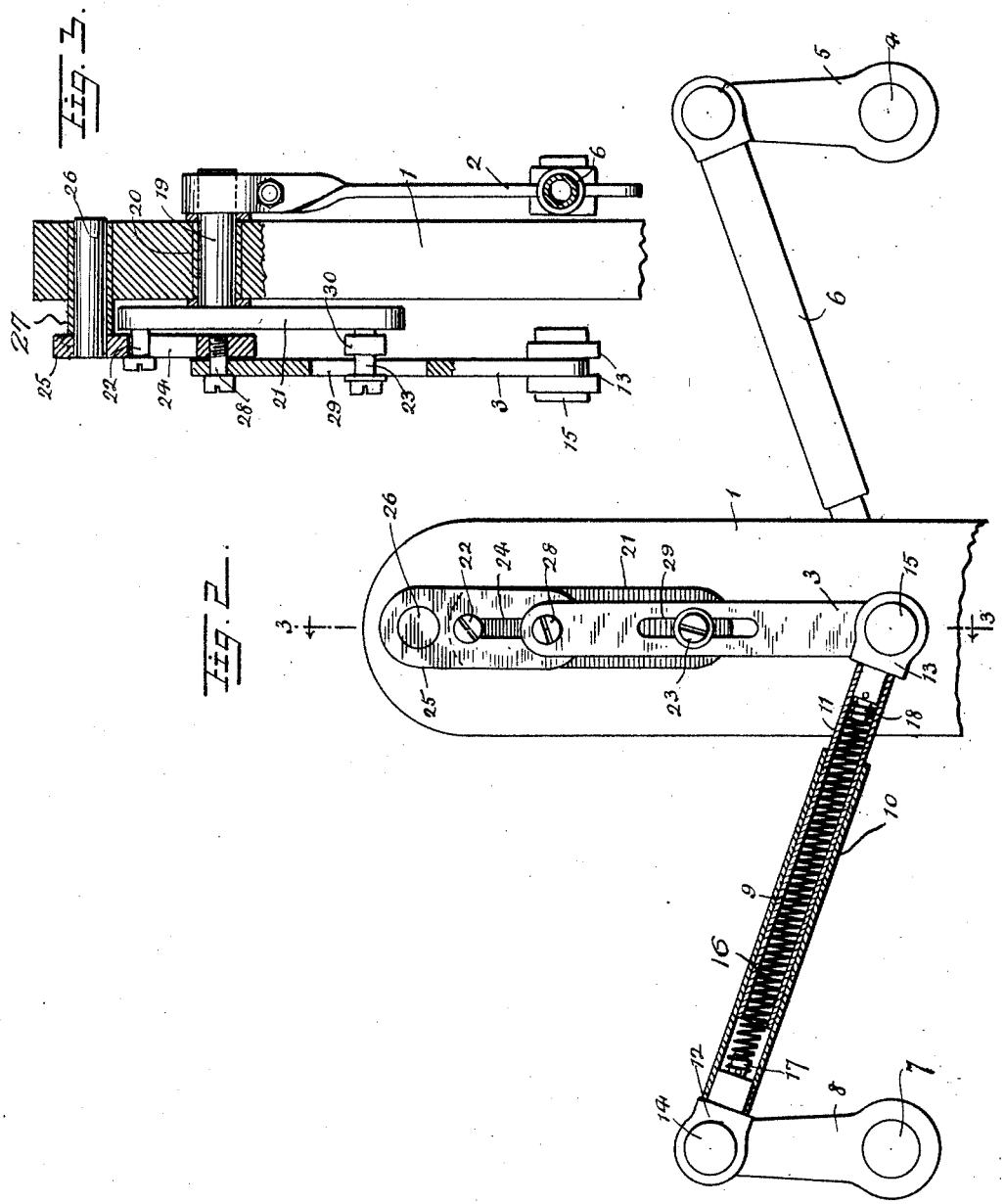

Patented May 7, 1929.

1,712,444

UNITED STATES PATENT OFFICE.

DOUGLAS F. MALTBY, OF BAY SHORE, NEW YORK, ASSIGNOR OF ONE-FOURTH TO CHARLES W. FRIEMAN, OF BAY SHORE, ISLIP, NEW YORK.

POWER-MULTIPLYING MECHANISM.

Application filed January 21, 1928. Serial No. 248,431.

This invention relates to power multiplying mechanism, or an improved form of leverage, the object being to provide in a simple way, means for transmitting power from one point to the other through levers whereby a different thrust will be presented at the driving means and driven means.

Another object of the invention is to provide a simplified form of lever mechanism whereby a comparatively long stroke may be given and translated into a power thrust of a shorter stroke with a minimum loss in transmission.

A further object of the invention is to provide lever power transmitting mechanism wherein the parts are so formed that one or a large number may be arranged in tandem.

In the accompanying drawings—

Figure 1 is a side elevation of a power transmitting mechanism disclosing an embodiment of the invention.

Figure 2 is a view similar to Figure 1, but with the parts in neutral position and certain parts broken away.

Figure 3 is a sectional view through Figure 2, approximately on line 3—3.

Referring to the accompanying drawings by numerals, 1 indicates a standard or frame which may be rigidly secured in position in any desired manner. As illustrated, 2 indicates a driven lever and 3 the primary driving lever. Lever 2 may be connected with any work while lever 3 may be connected with any suitable driving mechanism. As indicated in the drawings, lever 2 is connected to a driven shaft 4 through a crank 5 and connecting rod 6. Also, as shown in the drawing, the driving lever 3 is connected to a driving shaft 7 through crank 8 and connecting rod 9. The connecting rods 6 and 9 may be solid rods if desired, though in the drawing, a resilient or yielding rod is presented. As indicated at the left in Figure 2, rod 9 includes telescoping tubes 10 and 11 with end members 12 and 13. End member 12 is provided with an opening for receiving the wrist pin 14, while end member 13 is formed in a similar manner and provided with an opening for receiving the pin 15 which extends through a suitable aperture in lever 3. A spring 16 is rigidly secured to extensions 17 and 18 of members 12 and 13, said spring acting both as a compression spring and as a retractile spring so as to resist yieldingly, movement in either direction. The driven lever 2 is rigidly secured in any desired manner with the shaft 19 journaled in a suitable bearing 20 secured to the standard 1. This shaft is also rigidly secured to a lever 21 which has a pin 22 connected thereto near one end and a pin 23 connected thereto near the opposite end, pin 23 being also twice as far from the center of shaft 19 as pin 22. Pin 22 extends through a slot 24 in the power transmission lever 25, which lever is rigidly secured to shaft 26 journaled in a suitable bearing 27 carried by standard 1. A pin 28 is rigidly secured to the free end of the lever 25 and loosely extends through an aperture in lever 3 as shown in Figure 3. A slot 29 is formed in lever 3 through which pin 23 extends. A suitable spacing sleeve 30 is carried by pin 23 so as to properly space the levers 3 and 21. By reason of this arrangement of levers, the maximum leverage takes place when the parts are in substantially the position shown in Figure 2. By reason of the construction and arrangement of levers 21 and 25, this maximum leverage gradually diminishes to a minimum leverage when the parts have moved to the position shown in Figure 1. The reduction in leverage is not as great when the lever 3 moves toward the position in Figure 3 as it would be if lever 3 at the upper end was rigidly secured to shaft 19, as the respective levers 21 and 25 by permitting a sliding action of pins 22 and 23, assist in reducing the speed of reduction of leverage. However, when the parts have finally arrived at substantially the position shown in Figure 1, the reduction of leverage increases greatly as it nears this point, though for the first part of the swing the reduction is less than it would be if lever 3 was connected directly with shaft 19. In order to secure the benefit of this leverage action, the lower end of lever 3 is given a longer swinging action as indicated in Figure 1 than lever 2. The speed of the lower end of the lever will be naturally slightly greater than the speed of the lower end of lever 2 and, consequently, lever 2 will give a greater thrust than the thrust on lever 3, the difference in thrust being compensated by the difference in speed of the respective levers. By connecting the driven lever 2 with the driving lever 3 of a second power transmitting mechanism, a still greater thrust on the second driven lever 2 may be secured, but the swinging movement of the lever will, of course, be proportionately less, thus the power will be gradually increased though the movement will be less. In this way, from a comparatively small power unit a comparatively great thrust may be secured for a short distance. Also, if desired, the power element could be secured to the opposite end of the device and in that case, the shaft 7 would become the driven shaft and would be driven at a higher rate of speed than the power element. By reason of the arrangement of the respective levers 3, 21 and 25, a minimum loss produced by friction is secured, and yet power may be transmitted readily in either direction so as to secure a shorter stroke with greater power or a longer stroke with less power.

What I claim is:

1. A power leverage mechanism, comprising a standard, a power shaft rotatably mounted in said standard, an auxiliary shaft rotatably mounted in said standard, a driven lever rigidly secured to said power shaft, a power transmission lever having one end rigidly secured to said auxiliary shaft, said last mentioned lever having a longitudinally positioned slot, an equalizing lever rigidly secured to said power shaft, said equalizing lever being rigidly secured to said power shaft substantially two-thirds of the distance from one end, a driving lever pivotally mounted at the free end of said power transmission lever, a pin extending from the equalizing lever through the slot in the power transmission lever, said driving lever having a longitudinally positioned slot, and a pin extending from said equalizing lever through said last mentioned slot whereby as said driving lever is swung the equalizing lever will change the fulcrum thereof.

2. A lever mechanism, comprising a standard, a pair of shafts rockably mounted in the standard, a driven lever rigidly secured to one of said shafts, an auxiliary lever secured to each of said shafts and a driving lever pivotally connected with one of said auxiliary levers and slidingly connected with one end of the other auxiliary lever, said other auxiliary lever at the opposite end being slidingly connected with the lever acting as the pivotal support for the driving lever.

3. A power lever mechanism, comprising a driven lever, a rockable shaft rigidly secured to said driven lever, a compensating lever secured to said driven lever intermediate the ends of the compensating lever, a pin extending from each end of said compensating lever, a fulcrum lever pivotally mounted at one end and formed with a slot for accommodating one of said pins, and a driving lever pivotally mounted on the free end of said fulcrum lever, said driving lever having a slot for accommodating the other of said pins whereby as said driving lever is swung back and forth the effective fulcrum thereof will be shifted.

4. A power transmission lever mechanism, including a driven lever, a pivotally mounted power shaft having one end rigidly secured to one end of said driven lever, a driving lever mechanism of the same length as said driven lever, said mechanism including a driving lever, a compensating lever rigidly secured to said power shaft, a power transmission lever, an auxiliary shaft having one end rigidly secured to one end of said power transmission lever, a sliding and pivotal connection between one end of said compensating lever and the central part of said power transmission lever, means for pivotally connecting one end of said driving lever to the free end of said power transmission lever, and a sliding and pivotal connection between one end of said compensating lever and the central part of said driving lever.

Signed at Bay Shore, in the county of Suffolk and State of New York this 17th day of January, A. D. 1928.

DOUGLAS F. MALTBY.